(12) United States Patent
Winternitz et al.

(10) Patent No.: US 9,405,449 B2
(45) Date of Patent: Aug. 2, 2016

(54) LAYOUT CONSTRAINT MANIPULATION VIA USER GESTURE RECOGNITION

(75) Inventors: Fabian O. Winternitz, Sammamish, WA (US); Kael R. Rowan, Redmond, WA (US); Timothy G. Dwyer, Seattle, WA (US); Stuart Kent, Canterbury (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 559 days.

(21) Appl. No.: 12/687,388

(22) Filed: Jan. 14, 2010

(65) Prior Publication Data

US 2011/0173530 A1    Jul. 14, 2011

(51) Int. Cl.
G06F 3/033      (2013.01)
G06F 17/00      (2006.01)
G06F 3/0484     (2013.01)
G06F 3/0488     (2013.01)

(52) U.S. Cl.
CPC ........ *G06F 3/04845* (2013.01); *G06F 3/04883* (2013.01)

(58) Field of Classification Search
CPC .................................................... G06F 17/211
USPC .......................... 715/200, 246, 243, 788, 863
See application file for complete search history.

(56) References Cited

U.S. PATENT DOCUMENTS

| | | | | |
|---|---|---|---|---|
| 5,471,578 A | * | 11/1995 | Moran | G06F 3/04842 715/764 |
| 5,812,128 A | * | 9/1998 | Sterling, IV | 715/762 |
| 6,081,816 A | * | 6/2000 | Agrawal | G06F 17/211 715/210 |
| 6,393,432 B1 | * | 5/2002 | Flansburg et al. | |
| 6,732,114 B1 | * | 5/2004 | Aamodt et al. | 715/243 |
| 7,096,454 B2 | | 8/2006 | Damm et al. | |
| 7,142,205 B2 | * | 11/2006 | Chithambaram et al. | 345/418 |
| 7,372,993 B2 | * | 5/2008 | Lagardere et al. | 382/186 |
| 7,712,065 B2 | * | 5/2010 | Sakuraba | 716/119 |
| 7,743,325 B2 | * | 6/2010 | Berker | G06F 17/211 345/619 |
| 2004/0225962 A1 | * | 11/2004 | Ohashi et al. | 715/517 |
| 2006/0200384 A1 | * | 9/2006 | Arutunian et al. | 705/14 |
| 2008/0163130 A1 | * | 7/2008 | Westerman | 715/863 |
| 2008/0165153 A1 | * | 7/2008 | Platzer et al. | 345/173 |

(Continued)

FOREIGN PATENT DOCUMENTS

CN    1776667 A      5/2006
CN    101266516 A    9/2008

OTHER PUBLICATIONS

David A Edson, Microsoft Office Visio 2007 Tips & Tricks Documentation, 2008, Microsoft Corporation, pp. 1-67.*

(Continued)

*Primary Examiner* — Manglesh M Patel
(74) *Attorney, Agent, or Firm* — Kevin Sullivan; Micky Minhas

(57) ABSTRACT

Systems and methods are described herein for enabling a user of a diagramming system to select elements of a diagram and apply a layout constraint thereto. In accordance with certain embodiments described herein, the systems and methods provide the user with a means to perform these tasks in a manner that is faster, easier and more intuitive than interfaces provided by conventional diagramming systems. For example, in accordance with at least one embodiment described herein, a single user gesture is obtained and the steps of selecting elements of a diagram to which a layout constraint is to be applied and selecting the layout constraint are both performed based on the single user gesture.

20 Claims, 17 Drawing Sheets

(56) References Cited

U.S. PATENT DOCUMENTS

| | | | | |
|---|---|---|---|---|
| 2009/0079700 | A1* | 3/2009 | Abernathy | 345/173 |
| 2009/0089739 | A1 | 4/2009 | Mollicone et al. | |
| 2009/0228786 | A1 | 9/2009 | Danton et al. | |
| 2010/0058161 | A1* | 3/2010 | Coldicott et al. | 715/211 |
| 2010/0083190 | A1* | 4/2010 | Roberts et al. | 715/863 |
| 2010/0125825 | A1* | 5/2010 | Danton et al. | 717/105 |
| 2010/0235793 | A1* | 9/2010 | Ording et al. | 715/863 |
| 2010/0281359 | A1* | 11/2010 | Cao et al. | 715/243 |
| 2010/0325587 | A1* | 12/2010 | Danton et al. | 715/853 |
| 2011/0154234 | A1* | 6/2011 | Winternitz et al. | 715/765 |
| 2011/0167336 | A1* | 7/2011 | Aitken et al. | 715/239 |
| 2012/0324332 | A1* | 12/2012 | Zaragoza | G06F 9/4443 715/234 |
| 2013/0009990 | A1* | 1/2013 | Hsu | G06F 3/0488 345/629 |
| 2015/0153924 | A1* | 6/2015 | Felt | G06F 3/0482 715/765 |

OTHER PUBLICATIONS

Judy Lemke, Microsoft Office Visio 2007 Step by Step, Feb. 14, 2007, Microsoft Press, pp. 1-24.*

Damm et al., Creative Object-Oriented Modeling: Support for Intuition, Flexibility, and Collaboration in CASE Tools, 2000, pp. 27-43.*

Elsberry et al., Using XML and SVG to generate Dynamic UML Diagrams, Mar. 2003, Department of Computer Science Central Washington University, pp. 1-14.*

Rui Zhao, Incremental Recognition in Gesture-Based and Syntax-Directed Diagram Editors, Apr. 1993, ACM, pp. 95-100.*

Bonnie Biafore, Visio 2007 Bible, Apr. 2, 2007, John Wiley & Sons, pp. 1-11.*

Chok, et al, "Constraint-based Diagram Beautification", Retrieved at << http://www.csse.monash.edu.au/~marriott/ChoMarPat99.pdf>> In the proceedings of the IEEE Symposium on Visual Languages, 1999, pp. 1-8.

Seybold, et al., "An Effective Layout Adaptation Technique for a Graphical Modeling Tool" , Retrieved at <<http://delivery.acm.org/10.1145/780000/776971/p826-seybold.pdf?key1=776971&key2=3318665521&coll=Guide&dl=GUIDE&CFID=57976410&CFTOKEN=32338772>> In the proceedings of 25th International Conference on Software Engineering, 2003, pp. 826-827.

Gross, Mark D., "Stretch-A-Sketch: A Dynamic Diagrammer", Retrieved at <<http://depts.washington.edu/dmachine/PAPER/VL94/vl.html>> In the proceedings of IEEE Symposium on Visual Languages, Oct. 1994, pp. 11.

Minsky, et al., "Manipulating Simulated Objects with Real-world Gestures using a Force and Position Sensitive Screen", Retrieved at <<http://delivery.acm.org/10.1145/810000/808598/p195-minsky.pdf?key1=808598&key2=2244955521&coll=GUIDE&dl=GUIDE&CFID=57828830&CFTOKEN=43421964>> vol. 18, No. 3, Jul. 1984, pp. 9.

Bickerstaffe, et al., "Developing Domain-specific Gesture Recognizers for Smart Diagram Environments", Retrieved at <<http://www.csse.monash.edu.au/~berndm/Papers/GREC07.pdf>>In the proceedings of 7th International Workshop on Graphics Recognition. Recent Advances and New Opportunities 2008, pp. 145-156.

Dwyer, et al., "Dunnart: A Constraint-based Network Diagram Authoring Tool", Retrieved at <<http://www.csse.monash.edu.au/~tdwyer/authoring-tool.pdf>> In the proceedings of 16th International Symposium on Graph Drawing, Sep. 22-24, 2008, pp. 420-431.

Dwyer, Tim, "Scalable, Versatile and Simple Constrained Graph Layout", Retrieved at <<http://www.csse.monash.edu.au/~tdwyer/Dwyer2009FastConstraints.pdf>> vol. 28, No. 3, 2009.

Wobbrock, et al., "Gestures without Libraries, Toolkits or Training: A $1 Recognizer for User Interface Prototypes", Retrieved at <<http://faculty.washington.edu/wobbrock/pubs/uist-07.1.pdf>> In the proceedings of the 20th annual ACM symposium on User interface software and technology, Oct. 7-10, 2007, pp. 159-168.

Pavlidis, et al. "An Automatic Beautifier for Drawings and Illustrations," SIGGRAPH Comput. Graph. 19, 3 (Jul. 1985), 225-234.

Second Office Action Issued in Chinese Patent Application No. 201110026287.1, Mail Date: Jan. 15, 2015, 14 Pages.

Third Office Action Received for China Patent Application No. 201110026287.1, Mailed Date: Jun. 23, 2015, 6 Pages.

First Office Action and Search Report received for Chinese Patent Application No. 201110026287.1, Mail Date: Jun. 5, 2014, 14 Pages.

* cited by examiner

LAYOUT CONSTRAINT MANIPULATION VIA USER GESTURE RECOGNITION

BACKGROUND

Computer-implemented diagramming systems exist that enable users to author and edit graphical diagrams. To facilitate the authoring of complex diagrams, such as complex network diagrams or graphs, certain diagramming systems include a feature termed automatic layout. In accordance with this feature, the diagramming system automatically generates a diagram based on data that specifies the elements to be included in the diagram and any relationships there between, as well as on a set of rules or algorithms that govern certain layout considerations such as the size and placement of diagram elements.

Some diagramming systems that support automatic layout also support user-defined layout constraints. A layout constraint specifies a persistent layout relationship between certain elements in a diagram. Layout constraints provide a means by which a user can tailor or fine tune a diagram without having to explicitly position diagram elements. When a user defines a layout constraint with respect to diagram elements, the diagramming system sets up a persistent layout relationship between the diagram elements that is maintained in subsequent interactions. The layout constraint is maintained until such time as the user explicitly removes it. Examples of layout constraints include but are not limited to constraints that control the alignment of diagram elements, the distribution of diagram elements, and the separation between diagram elements.

User interfaces associated with certain conventional diagramming systems that support user-defined layout constraints are limited in that, to apply a layout constraint, the user must first select the elements that are to be involved in the constraint, and then must separately choose which type of constraint to apply.

SUMMARY

Systems and methods are described herein for enabling a user of a diagramming system to select elements of a diagram and apply a layout constraint thereto. In accordance with certain embodiments described herein, the systems and methods provide the user with a means to perform these tasks in a manner that is faster, easier and more intuitive than interfaces provided by conventional diagramming systems. For example, in accordance with at least one embodiment to be described herein, a single user gesture is obtained and the steps of selecting elements of a diagram to which a layout constraint is to be applied and selecting the layout constraint are both performed based on the single user gesture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 19:
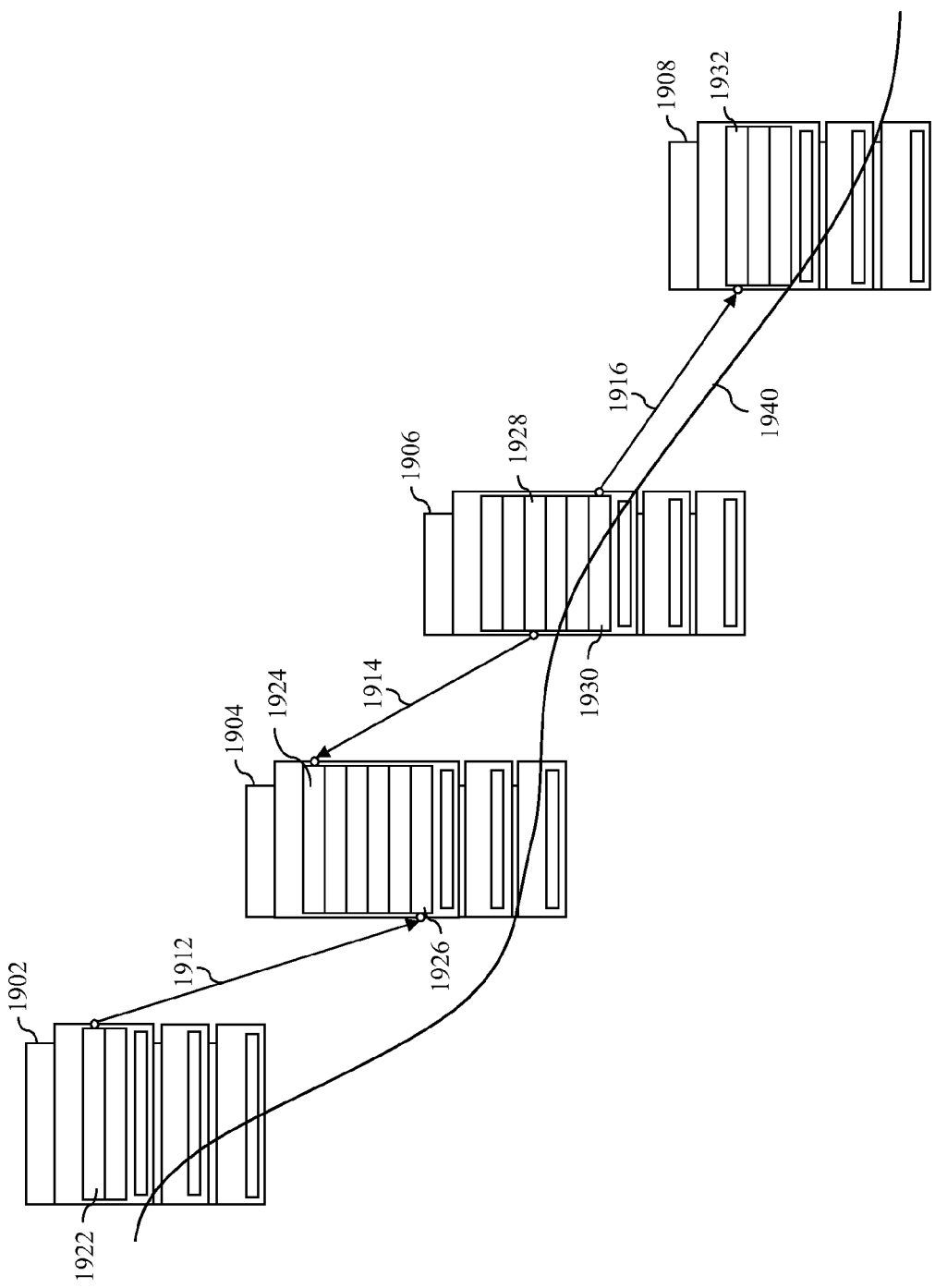
Figure 20:
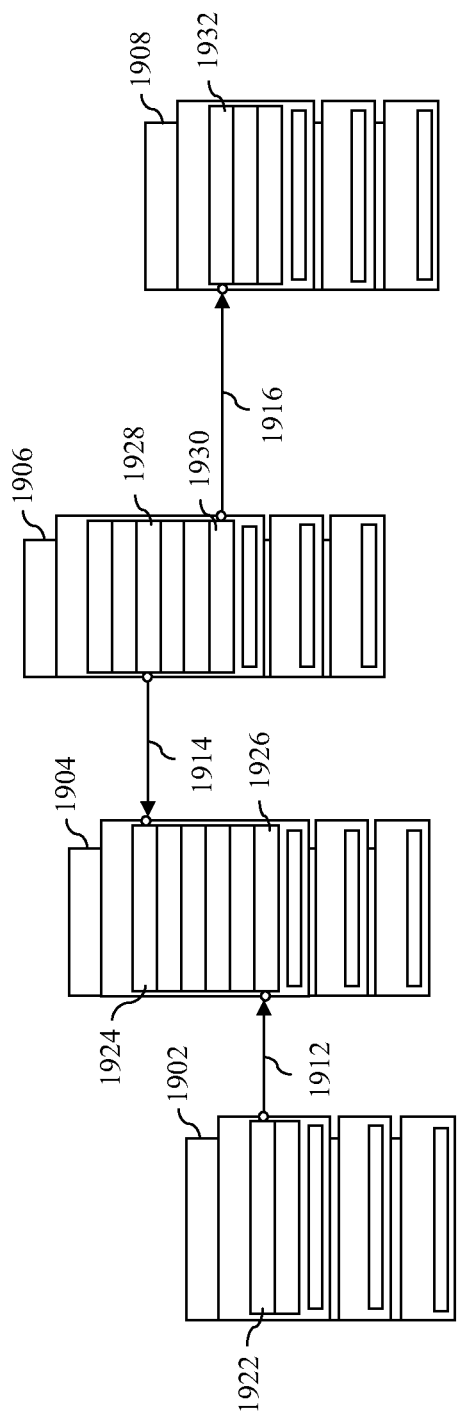

FIG. 19 depicts a portion of an exemplary diagram rendered to a display device to which a path defined by a user gesture has been mapped, wherein the manner in which the path intersects elements of the diagram indicates a horizontal alignment constraint is to be applied to the intersected elements FIG. 20 depicts a portion of the exemplary diagram of FIG. 19 after a horizontal alignment constraint has been applied to the intersected elements, the horizontal alignment constraint being implemented by aligning ports of the intersected elements.

Figure 21:
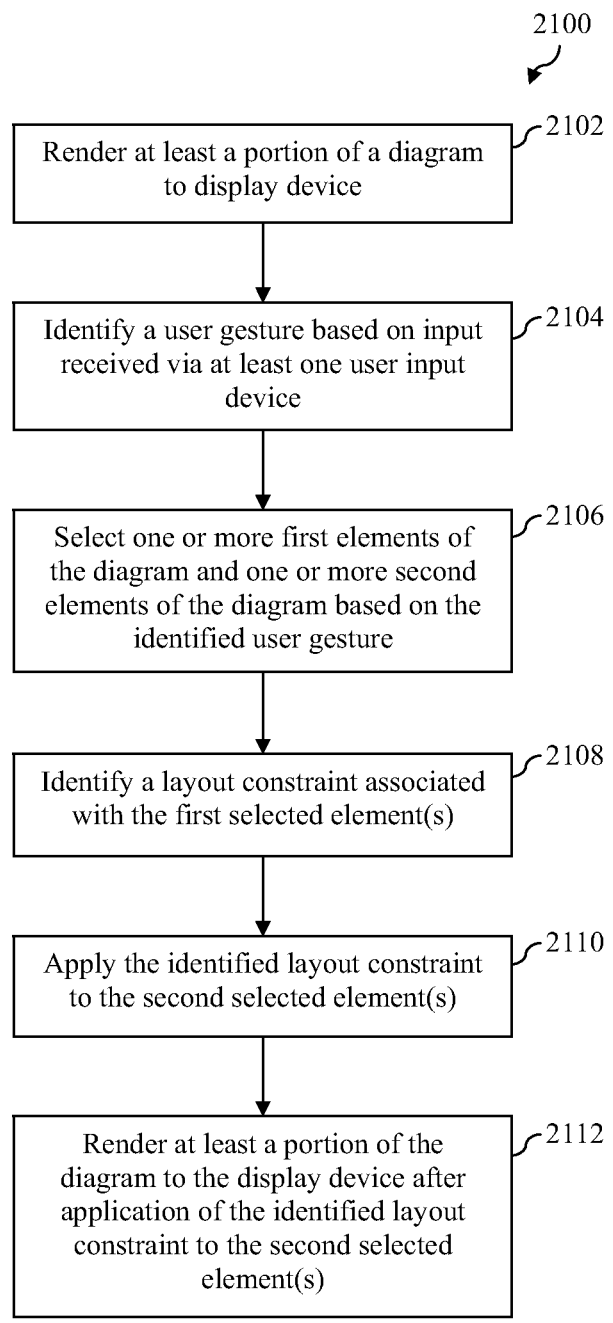

FIG. 21 is a flowchart that depicts a method for using user gestures to associate a layout constraint involving a first set of diagram elements with a second set of diagram elements.

Figure 22:
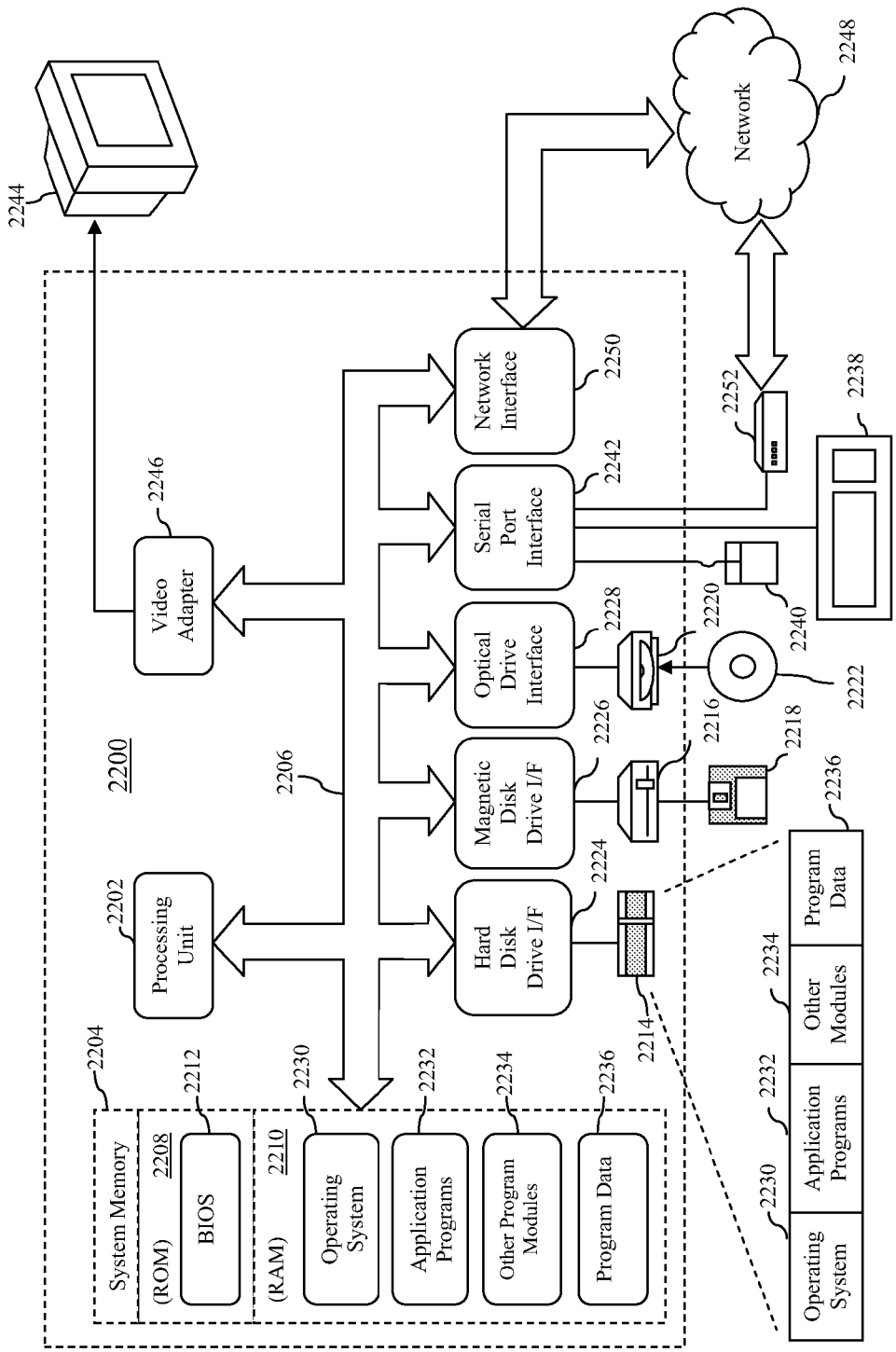

FIG. 22 depicts an example computer system that may be used to implement various aspects of the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Figure 1:
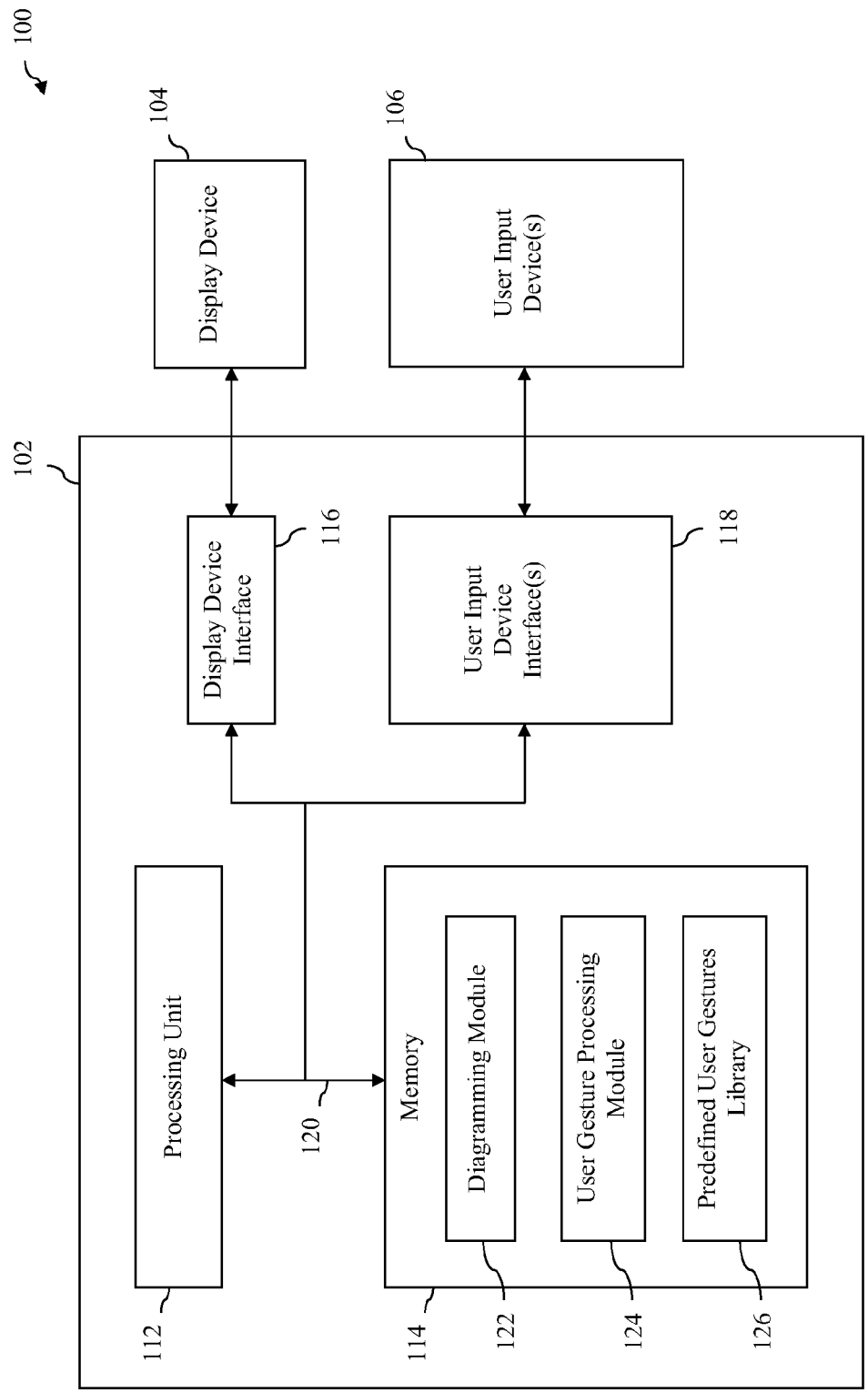
FIG. 1 is a block diagram of an example diagramming system that facilitates the manipulation of user-defined layout constraints via user gesture recognition.

II. Example Systems and Methods for Manipulating Layout Constraints via User Gesture Recognition FIG. 1 is a block diagram of an example diagramming system 100 that facilitates the manipulation of user-defined layout constraints via user gesture recognition. As shown in FIG. 1, diagramming system 100 includes a processor-based computing platform 102, a display device 104 that is connected to computing platform 102, and one or more user input devices 106 that are also connected to computing platform 102. Diagramming system 100 is intended to broadly represent any processor-based system upon which software may be executed for the benefit of a user. For example and without limitation, diagramming system 100 may comprise a desktop computing system, a laptop computer, a tablet computer, a video gaming system, a personal digital assistant (PDA), a smart phone, or a portable media player. A specific example of a processor-based computer system that may be used to implement diagramming system 100 will be described subsequently herein in reference to FIG. 22.

As further shown in FIG. 1, computing platform 102 includes at least a processing unit 112, a memory 114, a display device interface 116 and one or more user input device interfaces 118. These components are interconnected via a communication infrastructure 120, which may comprise for example one or more bus structures.

Processing unit 112 comprises one or more processors or processor cores that are configured to execute software modules and to access data stored in memory 114. The software modules stored in memory 114 include at least a diagramming module 122 and a user gesture processing module 124. The data stored in memory 114 includes at least a predefined gestures library 126. Memory 114 is intended to broadly represent any type of volatile memory, non-volatile memory, or combination thereof, and may be implemented across one or more storage devices or systems.

Display device interface 116 comprises an interface that renders video or graphics information received from processing unit 112 or memory 114 for display on display device 104. Display device interface 116 may comprise, for example, a video or graphics card that is configured to perform video or graphics rendering operations. Depending upon the implementation of diagramming system 100, display device 104 may comprise a monitor, a projector, or other type of display device that is physically separate from computing platform 102 and connected thereto via a suitable wired and/or wireless connection, or a display device that is integrated within the same physical structure as computing platform 102, such as an integrated display in a laptop computer, tablet computer, PDA or portable media player.

User input device interface(s) 118 comprise one or more interfaces for receiving user input information generated by user input device(s) 106 and for passing such input information to processing unit 112 for processing thereof. Depending upon the implementation, user input device(s) 106 may include a mouse, a keyboard, a touch pad, a trackball, a joystick, a pointing stick, a touch screen (e.g., a touch screen integrated with display device 104), a wired glove, a motion tracking sensor, a game controller or gamepad, or a video capture device such as a camera. However, these examples are not intended to be limiting and user input device(s) 106 may include other types of devices other than those listed herein. Depending upon the implementation, each user input device 106 may be physically separate from computing platform 102 and connected thereto via a suitable wired and/or wireless connection, or may be integrated within the same physical structure as computing platform 102, such as an integrated keyboard, touchpad, or touch screen on a laptop computer, tablet computer, PDA or portable media player.

Diagramming module 122 is a software module that, when executed by processing unit 112, enables a user of diagramming system 100 to author and edit graphical diagrams. During execution of diagramming module 122, diagram authoring and editing functions may be invoked by the user via manipulation of one or more of user input device(s) 106. The user input information generated through such manipulation is passed to processing unit 112 via user input device interface(s) 118. Processing unit 112 processes such user input information so that it can be properly interpreted by executing diagramming module 122. Furthermore, during execution of diagramming module 122, diagrams authored or edited by a user are rendered to display device 104 via display device interface 116 for viewing and/or manipulation by the user.

When executed by processing unit 112, diagramming module 122 also enables a user to invoke the automatic layout of diagrams and to apply user-defined layout constraints to elements of such diagrams. When automatic layout of diagrams is utilized, a diagram, such as a network diagram or graph, is automatically generated based on data that specifies elements to be included in the diagram and relationships there between, as well as on a set of rules or algorithms that govern certain layout considerations such as the size and placement of diagram elements. The generated diagram, or at least a portion thereof, is rendered to display device 104 via display device interface 116 for viewing and/or manipulation. The generation of a diagram using automatic layout may encompass both the generation of a new diagram and the updating or modification of an existing diagram.

Layout constraints specify a persistent layout relationship between certain elements in a diagram. Layout constraints provide a means by which a user can tailor or fine tune a diagram without having to explicitly position diagram elements. When a user defines a layout constraint with respect to diagram elements, a persistent layout relationship is created between the diagram elements that is maintained in subsequent interactions. The layout constraint is maintained until such time as the user explicitly removes the constraint. Examples of layout constraints include but are not limited to constraints that control the alignment of diagram elements, the distribution of diagram elements, and the separation between diagram elements.

Various methods for performing automatic layout and implementing layout constraints in a diagramming system are described in the literature and thus need not be described herein. For example, certain techniques for implementing these features are described in the references T. Dwyer, et al., "Dunnart: A Constraint-based Network Diagram Authoring Tool," Proc. $16^{th}$ Intl. Symp. Graph Drawing (GD'08), volume 5417 of Lecture Notes in Computer Science, pages 420-431 (Springer, 2009) and T. Dwyer, "Scalable, Versatile and Simple Constrained Graph Layout," Proc. Eurographics/IEEE-VGTC Symp. on Visualization (Eurovis 2009). Each of these references is incorporated by reference herein.

As will be described in more detail herein, diagramming module 122 is configured to enable processing unit 112 to obtain a single user gesture and to process the user gesture to select one or more elements of a diagram to which a layout constraint is to be applied and also to select the layout constraint to be applied to the selected elements. Thus, diagramming module 122 advantageously provides the user with a means to perform these tasks in a manner that is faster, easier and more intuitive than interfaces provided by conventional diagramming systems.

To facilitate obtaining a user gesture, processing unit 112 executes user gesture processing module 124. User gesture processing module 124 is configured to enable processing unit 112 to capture a user gesture based on user input information received from user input device(s) 106 via user input device interface(s) 118. The user gesture may be a single touch user gesture or a multi-touch user gesture. User gesture processing module 124 is further configured to determine whether or not the user gesture so captured matches any predefined user gestures stored in predefined user gestures library 126 and to pass recognized user gestures to an executing version of diagramming module 122.

Figure 2:
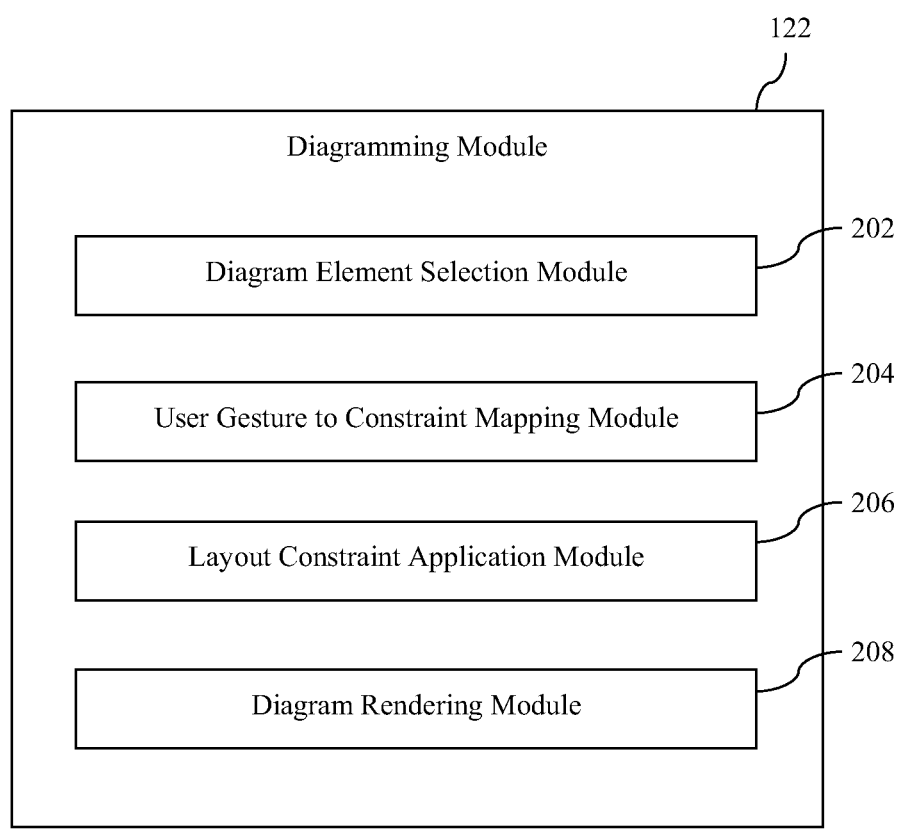
FIG. 2 is a block diagram that shows components of a diagramming module in accordance with one example embodiment.

FIG. 2 is a block diagram that depicts diagramming module 122 in more detail in accordance with one example embodiment. As shown in FIG. 2, diagramming module 122 includes a plurality of modules including a diagram element selection module 202, a user gesture to constraint mapping module 204, a layout constraint application module 206 and a diagram rendering module 208. Diagram element selection module 202 comprises logic that, when executed by processing unit 112, selects one or more elements of a diagram based on a user gesture obtained via execution of user gesture processing module 124. User gesture to constraint mapping module 204 comprises logic that, when executed by processing unit 112, selects a layout constraint based on a user gesture obtained via execution of user gesture processing module 124. Layout constraint application module 206 comprises logic that, when executed by processing unit 112, applies a layout constraint selected by user gesture to constraint mapping module 204 to one or more elements selected by diagram element selection module 202. Diagram rendering module 208 comprises logic that, when executed by processing unit 112, renders a diagram or portion thereof to display device 104 via display device interface 116.

In one implementation, diagramming module 122, user gesture processing module 124 and predefined user gestures library 126 all comprise components of the same software application. For example, diagramming module 122, user gesture processing module 124 and predefined user gestures library 126 may all comprise components of a diagramming application or an application that includes built-in diagramming capabilities. In an alternate implementation, diagramming module 122 and user gesture processing module 124 comprise separate applications. In a further alternate implementation, diagramming module 122 comprises all or a portion of a diagramming application and user gesture processing module 124 and predefined user gestures library 126 comprise components of an operating system upon which diagramming module 122 is executed. Still other implementations are possible.

In an alternate implementation not shown in FIG. 1 or 2, the functionality of diagramming system 100 is implemented in a client-server environment. In accordance with such an implementation, various functions performed by diagramming system 100 are distributed between a client computer and a server computer, wherein the client computer and server computer are communicatively connected via one or more networks. For example, in accordance with one such implementation, a client computer may be used to receive user input, obtain user gestures therefrom, and to display diagrams for viewing and/or manipulation by a user, while a server computer may be used to perform the remaining diagramming-related functions of system 100. Other approaches to distributing functionality between a client computer and a server computer may be utilized.

Figure 3:
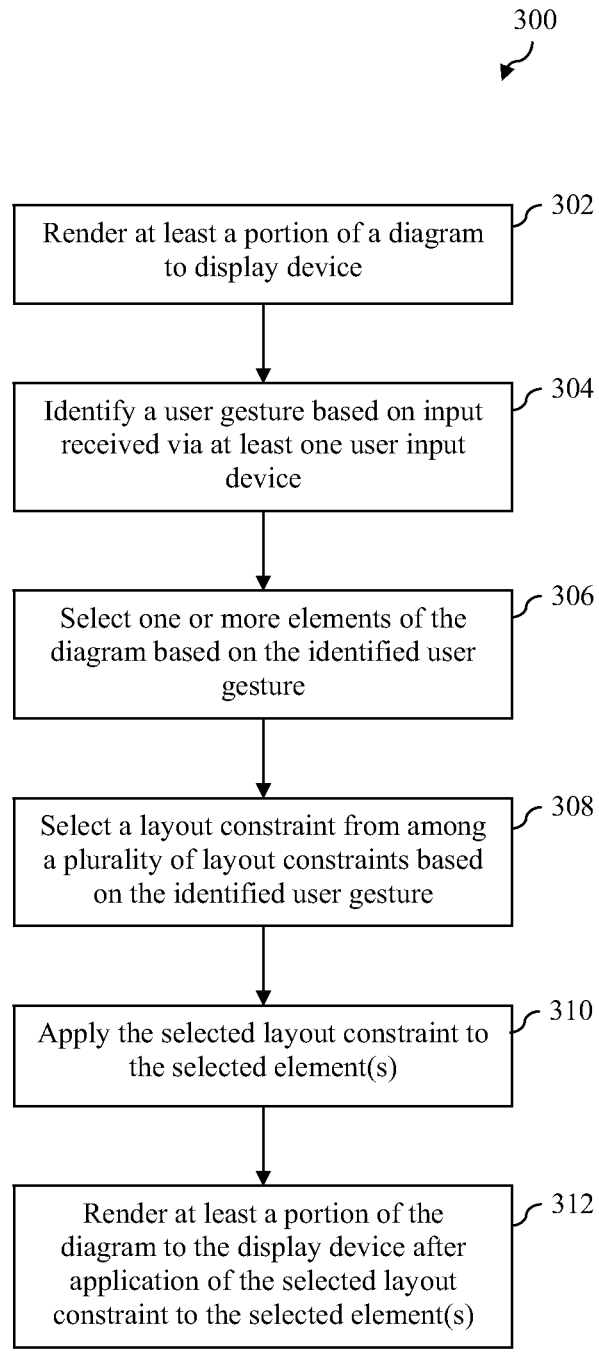
FIG. 3 is a flowchart that depicts a method for manipulating user-defined layout constraints via user gesture recognition in accordance with an example embodiment.

FIG. 3 depicts a flowchart 300 of a method for manipulating user-defined layout constraints via user gesture recognition in accordance with an example embodiment. Although the method of flowchart 300 will be described herein in reference to various elements of diagramming system 100 as described above in reference to FIGS. 1 and 2, persons skilled in the relevant art(s) will readily appreciate that the method is not limited to that implementation and may be implemented by other systems or elements.

As shown in FIG. 3, the method of flowchart 300 begins at step 302 in which diagram rendering module 208 is executed by processing unit 112 to render at least a portion of a diagram to display device 104. The diagram comprises a plurality of elements. For example, in an embodiment in which the diagram comprises a network diagram or graph, the elements may comprise nodes in the network diagram or graph. As another example, the elements may also comprise edges that connect such nodes. Still other types of elements may be included within a diagram.

At step 304, user gesture processing module 124 is executed by processing unit 112 to identify a user gesture based on input received via at least one of user input device(s) 106. At least one manner of performing this step will be described in more detail below.

At step 306, diagram element selection module 202 is executed by processing unit 112 to select one or more of the elements of the diagram based on the user gesture identified during step 304.

At step 308, user gesture to constraint mapping module 204 is executed by processing unit 112 to select a layout constraint from among a plurality of layout constraints made available by diagramming module 122 based on the user gesture identified during step 304.

At step 310, layout constraint application module 206 is executed by processing unit 112 to apply the layout constraint selected during step 308 to the element(s) selected during step 306.

At step 312, diagram rendering module 208 is executed by processing unit 112 to render at least a portion of the diagram to display device 104 after application of the selected layout constraint to the selected element(s). During this step, if the application of the selected layout constraint to the selected element(s) has caused a change in the layout of the diagram, that change may be made apparent to the user when the diagram, or portion thereof, is viewed by the user on display device 104.

Figure 4:
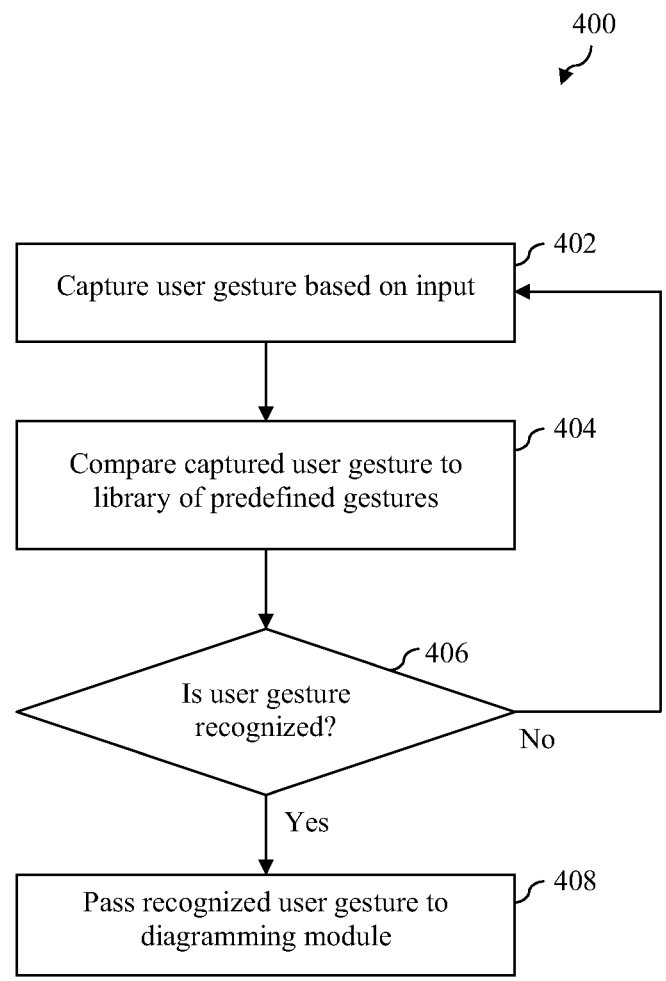
FIG. 4 is a flowchart that depicts one method for identifying a user gesture based on input received via one or more user input devices.

FIG. 4 is a flowchart 400 that depicts one method for identifying a user gesture based on input received via one or more user input devices. The method of flowchart 400 may be used, for example, to implement step 304 of flowchart 300 which was described above in reference to FIG. 3. Although the method of flowchart 400 will be described herein in reference to various elements of diagramming system 100 as described above in reference to FIGS. 1 and 2, persons skilled in the relevant art(s) will readily appreciate that the method is not limited to that implementation and may be implemented by other systems or elements.

As shown in FIG. 4, the method of flowchart 400 begins at step 402, in which user gesture processing module 124 is executed by processing unit 112 to capture a user gesture based on input received via at least one of user input device(s) 106. As will be appreciated by persons skilled in the art, the manner in which a user gesture is captured will depend at least in part on the type of user input device(s) used to perform the gesture. For example, in one embodiment in which a mouse is used to perform the gesture, user gesture processing module 124 may cause processing unit 112 to initiate capture of a user gesture when a user depresses a particular button on the mouse. While the button is depressed, the movement of the mouse across a mouse pad or other surface is tracked to determine a path or shape associated with the user gesture. When the button is released, capture of the user gesture is completed.

In an embodiment in which a touch screen is used to capture the user gesture, the user gesture may be captured by tracking the touch of a finger or stylus against the touch screen during a designated capture period. A similar approach may be used for a touch pad. In alternate embodiments that utilize motion tracking sensors and/or video capture devices such as cameras, the motions of a user in space may be tracked and interpreted to capture gestures. Still other techniques may be used premised on the use of any of the aforementioned types of user input devices or based on various other types of user input devices. In certain implementations, more than one user input device may used to capture the user gesture.

At step 404, the user gesture captured during step 402 is compared to the predefined user gestures stored in predefined user gestures library 126. At decision step 406, if a matching predefined user gesture is found, then the user gesture captured during step 402 is deemed recognized and the matching predefined user gesture is passed to diagramming module 122 as shown at step 408. However, if no matching predefined user gesture is found, then the user gesture is captured during step 402 is deemed unrecognized and control flows back to step 402 to capture another user gesture.

The foregoing describes only one example of a method for identifying a user gesture based on input received via one or more user input devices. Persons skilled in the relevant art(s) will readily appreciate that any of a wide variety user gesture recognition systems and algorithms may be used to perform this function. For example, in accordance with one embodiment, a low-complexity user gesture recognizer may be used such as that described in J. Wobbrock et al., "Gestures without Libraries, Toolkits or Training: A $1 Recognizer for User Interface Prototypes," ACM Symposium on User Interface Software and Technology (UIST) '07, Oct. 7-10, 2007, Newport, Rhode Island (2007). Still other types of user gesture recognizers may be used.

Figure 5:
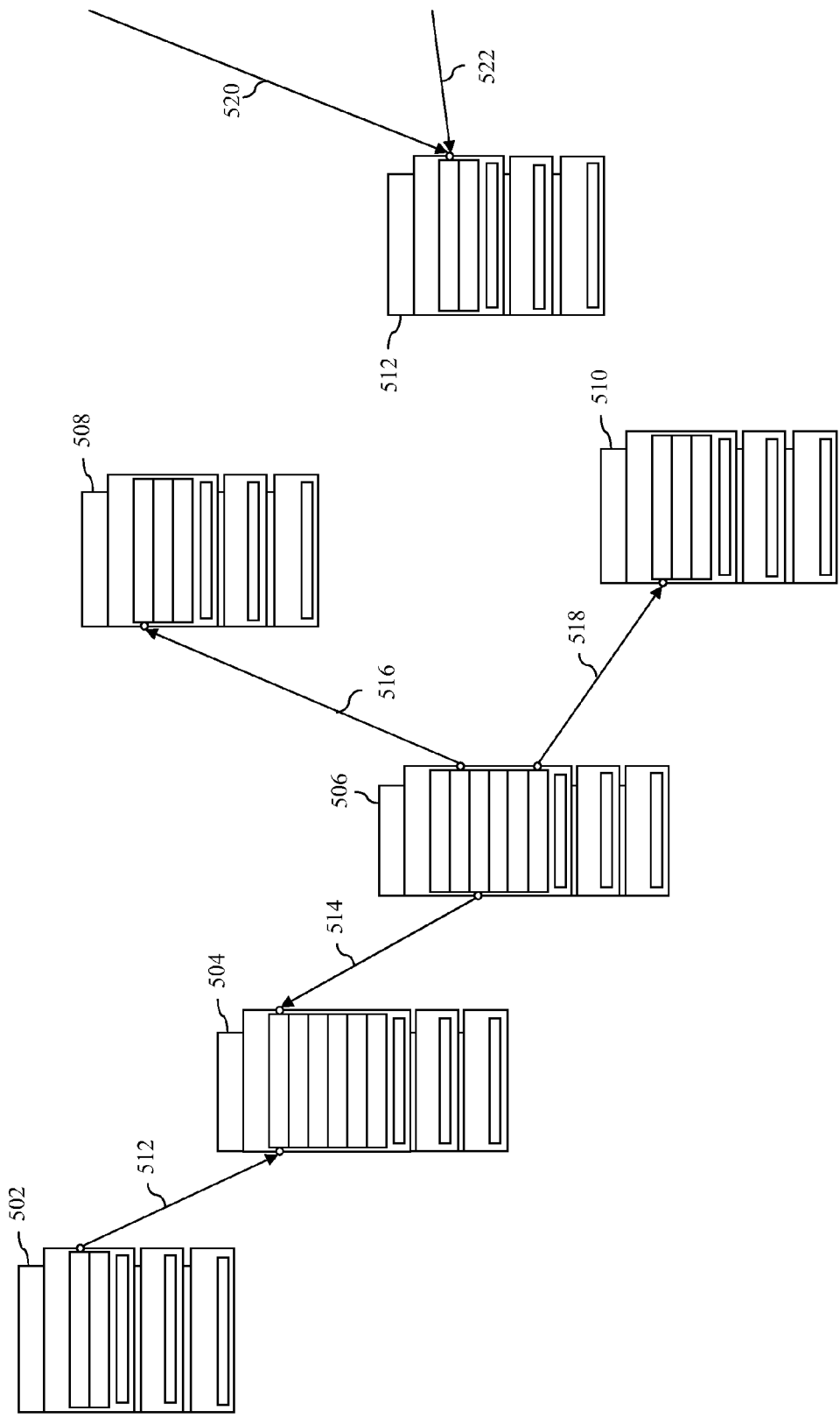
FIG. 5 depicts a portion of an exemplary diagram rendered to a display device.

In one embodiment, the step of selecting one or more elements of the diagram based on the identified user gesture as described above in reference to step 306 of flowchart 300 comprises selecting elements of the diagram that are intersected by a path defined by the user gesture. This will now be illustrated with respect to FIGS. 5-7, each of which depicts a portion of an exemplary diagram that has been rendered to display device 104 via the execution of diagram rendering module 208. As shown in FIG. 5, the portion of the diagram includes a plurality of nodes 502, 504, 506, 508, 510 and 512 and a plurality of edges 512, 514, 516, 518, 520 and 522. Edge 512 connects node 502 to node 504, edge 514 connects node 504 to node 506, edge 516 connects node 506 to node 508, and edge 518 connects node 506 to node 510. Edges 520 and 522 connect node 512 to other nodes that are not shown within the display area of display device 104. In the portion of the diagram shown in FIG. 5, each node is intended to represent a table in a relational database and each edge is intended to represent a relationship between two tables, such as for example a shared field or column. However, this is only one example. Persons skilled in the relevant art(s) will appreciate that each node may represent a wide variety of entity types and that each edge may represent a wide variety of relationship types depending upon the application. As shown in FIG. 5, a particular layout of nodes and edges has been generated via execution of diagram rendering module 208. This layout may have been automatically generated in accordance with one or more automatic layout rules and one or more user-defined layout constraints.

Figure 6:
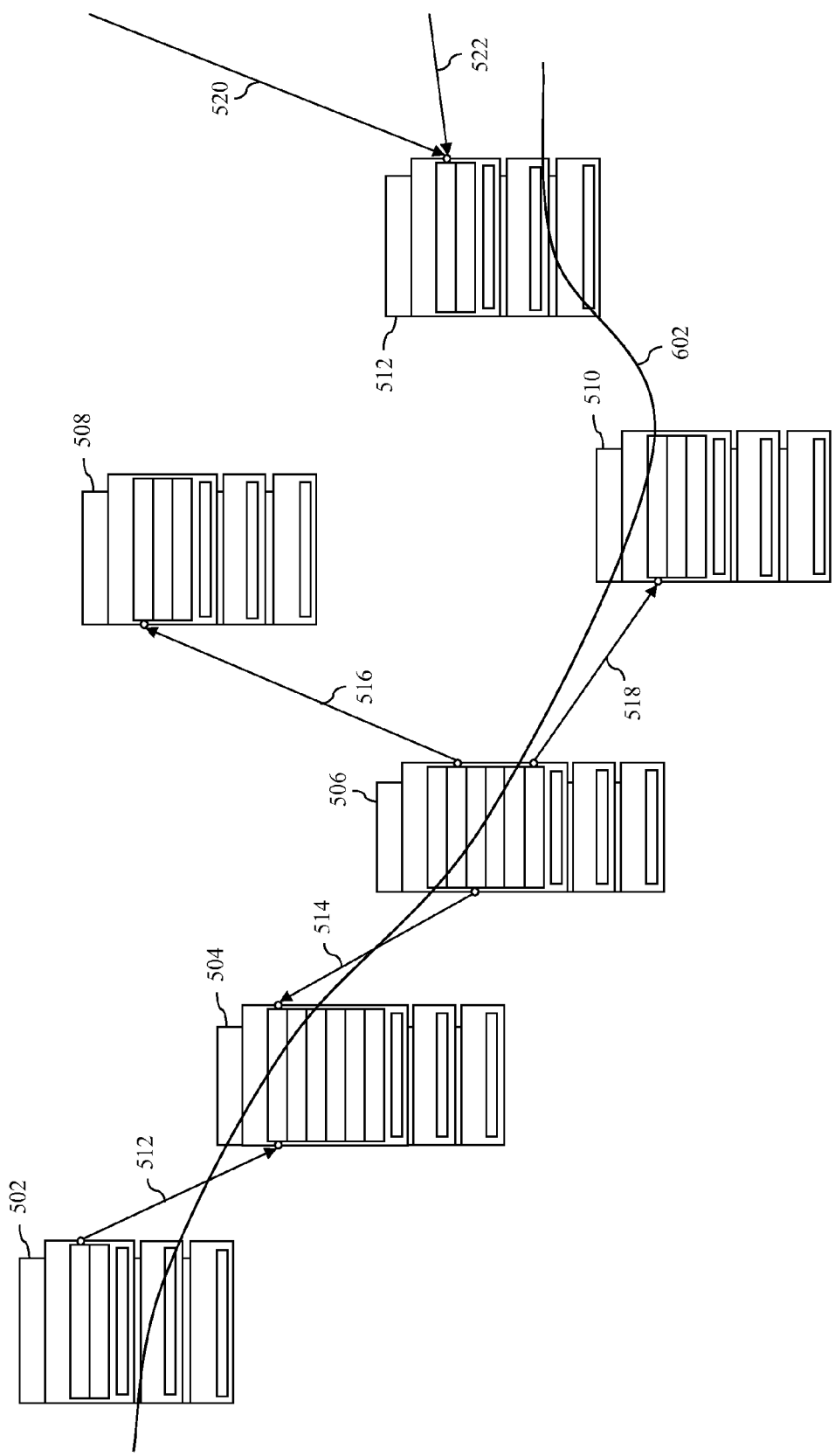
FIG. 6 depicts a portion of the exemplary diagram of FIG. 5 to which a path defined by a user gesture has been mapped, wherein the path intersects elements of the diagram.

FIG. 6 depicts the portion of the exemplary diagram rendered to display device 104 after a user gesture has been captured and recognized via execution of user gesture processing module 124. After recognition of the user gesture, diagramming module 122 is executed to map a path associated with the user gesture to the portion of the diagram displayed by display device 104. This path is depicted as path 602 in FIG. 6. In one embodiment, diagram rendering module 208 is executed to render a line along path 602, thereby providing a user with a visual indication of the path of the user gesture and how it aligns with the displayed portion of the diagram.

As shown in FIG. 6, path 602 intersects nodes 502, 504, 506, 510 and 512. In accordance with one embodiment, diagram element selection module 202 is configured to select these nodes as the nodes to which a layout constraint will be applied by virtue of the fact that these nodes are intersected by path 602.

In addition to performing node selection based on path 602 defined by a user gesture, an embodiment also determines which of a plurality of layout constraints to apply to the selected nodes based on the same user gesture as described above in reference to step 308 of flowchart 300. For example, in one embodiment, user gesture to constraint mapping module 204 is configured to select a vertical alignment constraint if the path defined by the user gesture corresponds to a vertical line and to select a horizontal alignment constraint if the path defined by the user gesture corresponds to a horizontal line.

Figure 7:
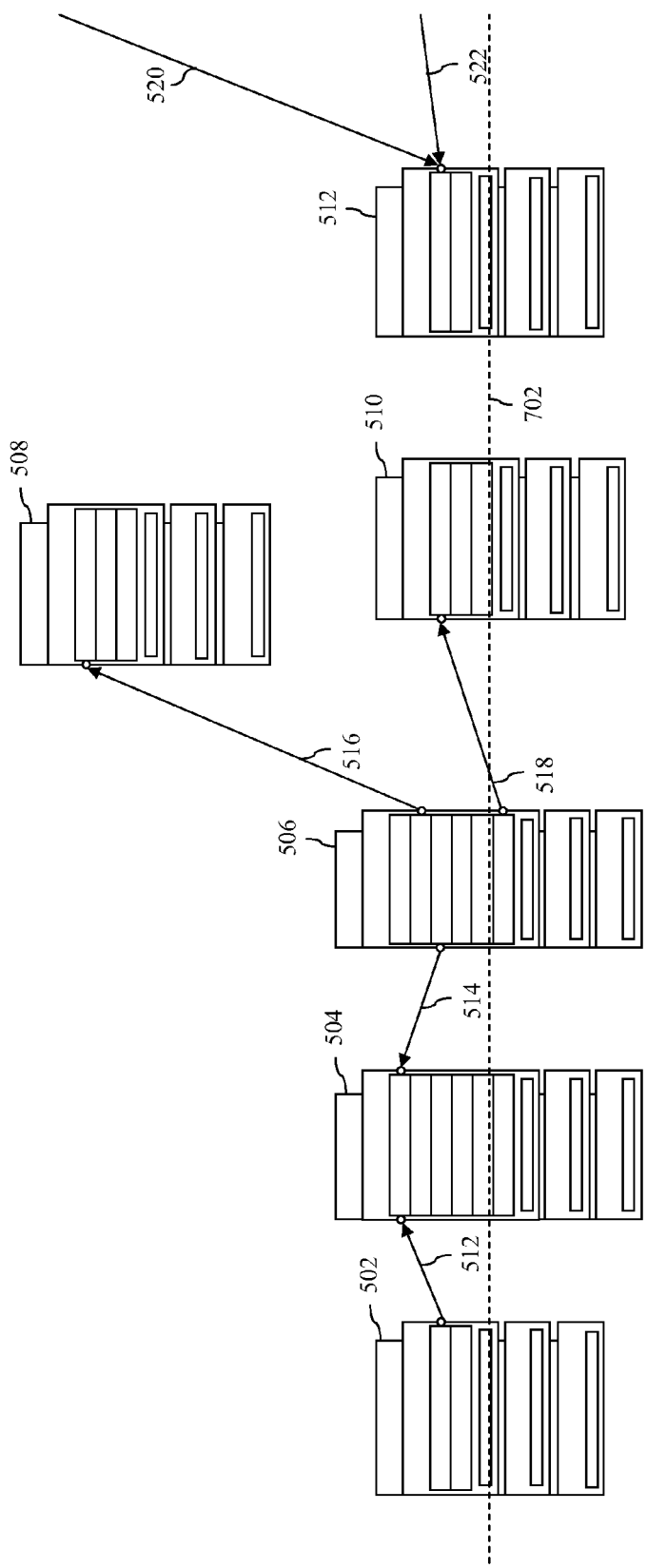
FIG. 7 depicts a portion of the exemplary diagram of FIGS. 5 and 6 after a horizontal alignment constraint has been applied to the intersected elements.

This is illustrated in part by FIG. 7, which shows a portion of the diagram depicted in FIGS. 5 and 6 after the diagram has been updated via execution of layout constraint application module 206 and rendered again to display device 104 via execution of diagram rendering module 208. As shown in FIG. 7, path 602 of the user gesture has been interpreted as a horizontal line and thus a horizontal alignment constraint has been applied to selected nodes 502, 504, 506, 510 and 512. In accordance with this example, the horizontal alignment constraint has caused a horizontal axis of each of the selected nodes to be aligned with a horizontal guideline 702. Depending upon the implementation or the configuration of diagramming system 100, guideline 702 may or may not be made visible to the user.

Various methods may be used to determine if the path associated with a user gesture is interpreted as a horizontal line or a vertical line. For example, in one embodiment, a bounding box is defined around the path of the user gesture, wherein the left and right sides of the bounding box are placed at the left-most and right-most points of the path, respectively, and the top and bottom sides of the bounding box are placed at the top-most and bottom-most points of the path, respectively. If the width of the bounding box exceeds the height of the bounding box, then the user gesture is determined to be a horizontal line. If the height of the bounding box exceeds the width of the bounding box, then the user gesture is determined to be a vertical line. However, this is only one technique and persons skilled in the relevant art(s) will readily appreciate that numerous other techniques may be used to determine if the path associated with a user gesture is to be interpreted as a horizontal line or a vertical line.

In an embodiment in which elements of a diagram that are intersected by a path of a user gesture are selected for application of a layout constraint, the manner in which the path intersects one or more of the elements may be used to determine the type of layout constraint to be applied. This will now be more fully explained with reference to flowchart 800 of FIG. 8. Although the method of flowchart 800 will be described herein in reference to various elements of diagramming system 100 as described above in reference to FIGS. 1 and 2, persons skilled in the relevant art(s) will readily appreciate that the method is not limited to that implementation and may be implemented by other systems or elements.

Figure 8:
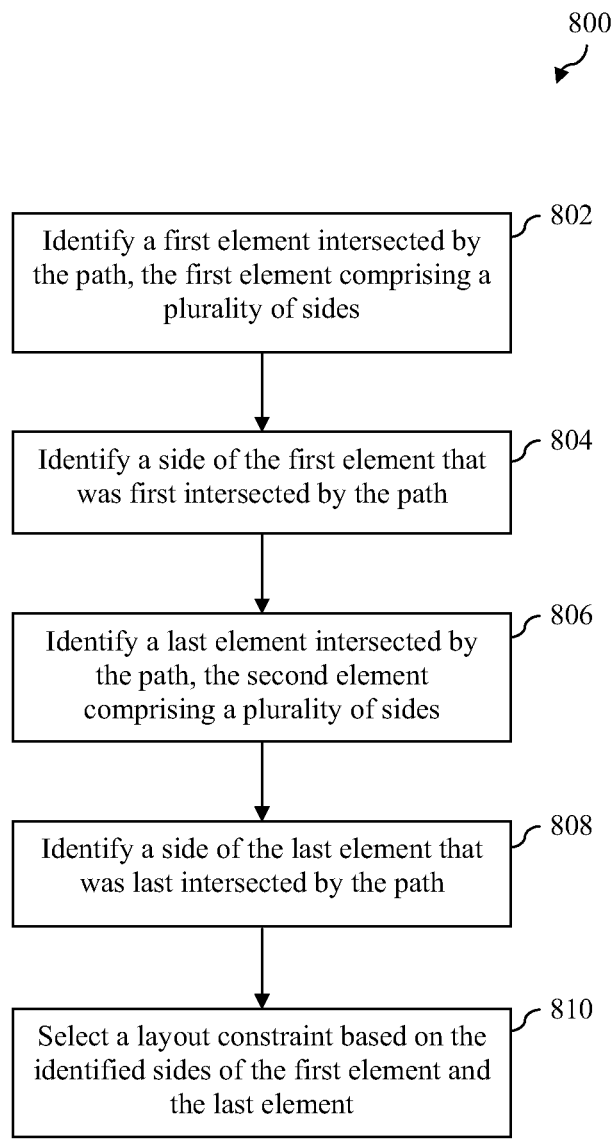
FIG. 8 is a flowchart that depicts a method for selecting a layout constraint to be applied to elements of a diagram based on the manner in which a path defined by a user gesture intersects one or more elements of the diagram.

As shown in FIG. 8, the method of flowchart 800 begins at step 802 in which user gesture to constraint mapping module 204 is executed to identify a first element intersected by a path defined by a user gesture wherein the first element is a shape that comprises a plurality of sides. For example, the first element may comprise a square, rectangle or other polygon. Since a user gesture may be captured over time, the path defined by the user gesture may be analyzed in a temporal manner. Using such a temporal analysis, it may be determined which element of a diagram was first intersected by the path.

At step 804, user gesture to constraint mapping module 204 is executed to identify a side of the first element that was first intersected by the path. As noted above, the path defined by the user gesture may be analyzed in a temporal manner. Using such a temporal analysis, it may be determined which side of the first element was first intersected by the path. This side may be thought of as the "point of entry" of the path into the first element.

At step 806, user gesture to constraint mapping module 204 is executed to identify a last element intersected by the path, wherein the last element also comprises a shape that comprises a plurality of sides. The last element intersected by the path may be determined by performing a temporal analysis of the path.

At step 808, user gesture to constraint mapping module 204 is executed to identify a side of the last element that was last intersected by the path. A temporal analysis of the path may be used to determine which side of the last element was last intersected by the path. This side may be thought of as the "point of exit" of the path out of the last element.

At step 810, user gesture to constraint mapping module 204 is executed to select a layout constraint based on the sides of the first element and the last element identified during steps 806 and 808. The layout constraint may comprise, for example, an alignment constraint. The alignment constraint may comprise for example a horizontal, vertical or diagonal alignment constraint although these examples are not intended to be limiting.

Figure 9:
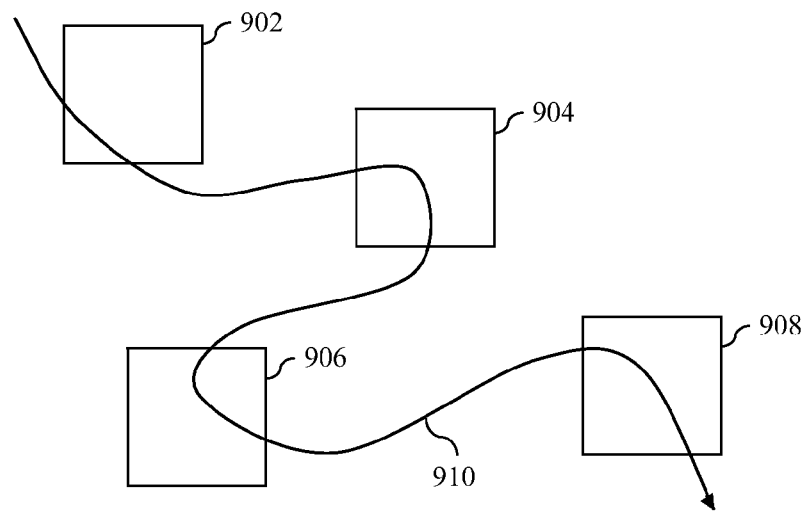
FIG. 9 depicts a portion of an exemplary diagram rendered to a display device to which a path defined by a user gesture has been mapped, wherein the manner in which the path intersects elements of the diagram indicates a diagonal alignment constraint is to be applied to the intersected elements.

Various examples of how the method of flowchart 800 may be used to select a layout constraint will now be provided with respect to FIGS. 9-14. For example, FIG. 9 depicts a portion of an exemplary diagram that has been rendered to display device 104 via the execution of diagram rendering module 208. As shown in FIG. 9, the portion of the diagram includes a plurality of elements 902, 904, 906 and 908, each of which comprises a top, bottom, left and right side. As also shown in FIG. 9, a path 910 associated with a user gesture has been mapped across and intersects each of the elements. From a temporal standpoint, path 910 begins at the end that does not include an arrow and extends over time to the end that does include an arrow. Thus, path 910 intersects element 902 first and intersects element 908 last. Furthermore, path 910 intersects the left side of element 902 first and intersects the bottom side of element 908 last.

Figure 10:
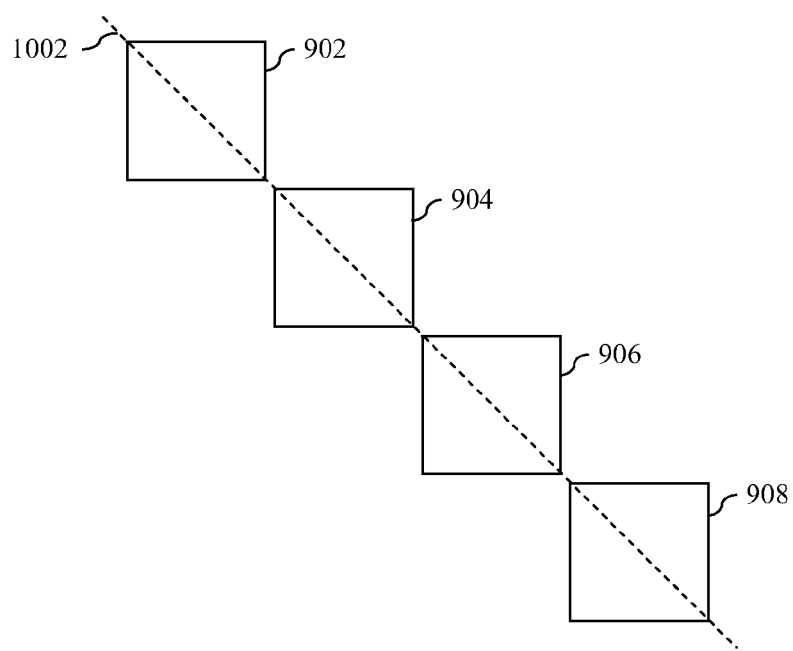
FIG. 10 depicts a portion of the exemplary diagram of FIG. 9 after a diagonal alignment constraint has been applied to the intersected elements.

In accordance with one embodiment, if the first side of the first multi-sided element intersected by a path defined by a user gesture is the left side and the last side of the last multi-sided element intersected by the path is the bottom side (as is the case in FIG. 9), then a diagonal alignment constraint will be applied to the first multi-sided element, the last multi-sided element and all intervening intersected elements. This is illustrated by FIG. 10, which shows the portion of the exemplary diagram from FIG. 9 after a diagonal alignment constraint has been applied to elements 902, 904, 906 and 908. In accordance with this example, the diagonal alignment constraint has caused a diagonal axis of each of nodes 902, 904, 906 and 908 to be aligned with a diagonal guideline 1002. Depending upon the implementation or the configuration of diagramming system 100, guideline 1002 may or may not be made visible to the user.

Figure 11:
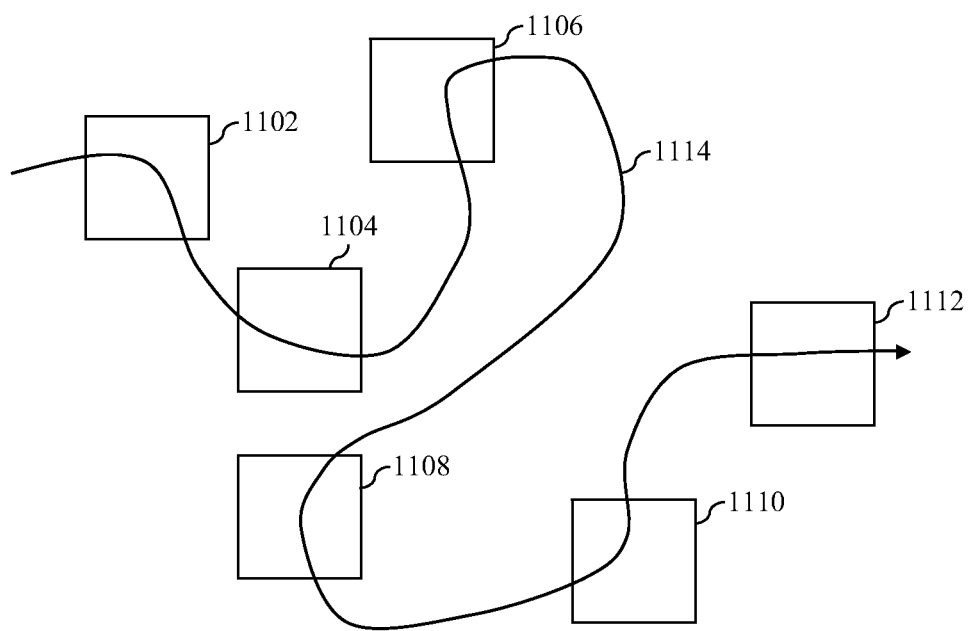
FIG. 11 depicts a portion of an exemplary diagram rendered to a display device to which a path defined by a user gesture has been mapped, wherein the manner in which the path intersects elements of the diagram indicates a horizontal alignment constraint is to be applied to the intersected elements.
Figure 12:
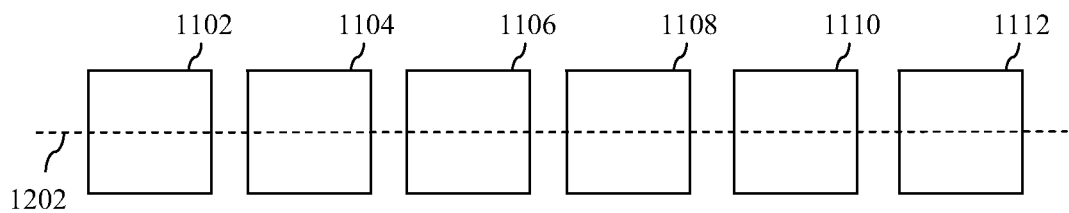
FIG. 12 depicts a portion of the exemplary diagram of FIG. 11 after a horizontal alignment constraint has been applied to the intersected elements.

FIGS. 11 and 12 provide an example of the use of the method of flowchart 800 to select a horizontal alignment constraint. In particular, FIG. 11 depicts a portion of an exemplary diagram that has been rendered to display device 104 via the execution of diagram rendering module 208. As shown in FIG. 11, the portion of the diagram includes a plurality of elements 1102, 1104, 1106, 1108, 1110 and 1112, each of which comprises a top, bottom, left and right side. As also shown in FIG. 9, a path 1114 associated with a user gesture has been mapped across and intersects each of the elements. From a temporal standpoint, path 1114 begins at the end that does not include an arrow and extends over time to the end that does include an arrow. Thus, path 1114 intersects element 1102 first and intersects element 1112 last. Furthermore, path 1114 intersects the left side of element 1102 first and intersects the right side of element 1112 last.

In accordance with one embodiment, if the first side of the first multi-sided element intersected by a path defined by a user gesture is the left side and the last side of the last multi-sided element intersected by the path is the right side (as is the case in FIG. 11), then a horizontal alignment constraint will be applied to the first multi-sided element, the last multi-sided element and all intervening intersected elements. This is illustrated by FIG. 12, which shows the portion of the exemplary diagram from FIG. 11 after a horizontal alignment constraint has been applied to elements 1102, 1104, 1106, 1108, 1110 and 1112. In accordance with this example, the horizontal alignment constraint has caused a horizontal axis of each of nodes 1102, 1104, 1106, 1108, 1110 and 1112 to be aligned with a horizontal guideline 1202. Depending upon the implementation or the configuration of diagramming system 100, guideline 1202 may or may not be made visible to the user.

Figure 13:
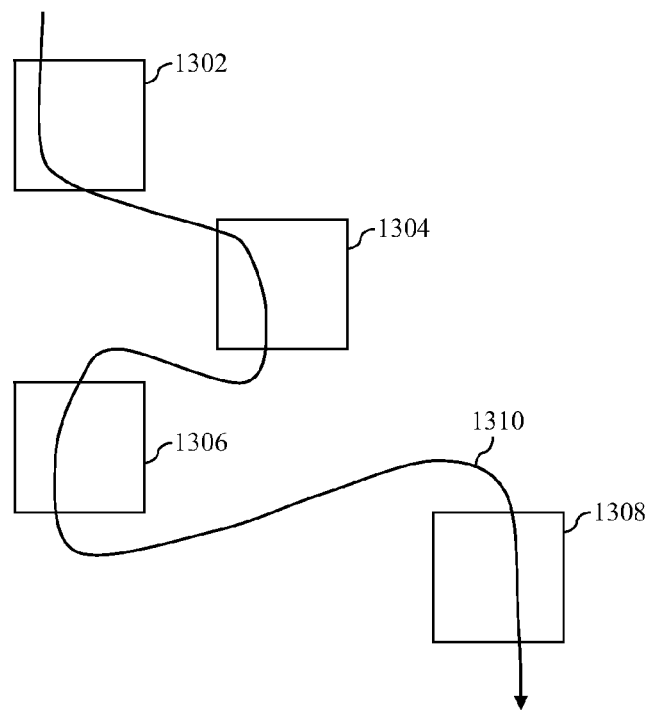
FIG. 13 depicts a portion of an exemplary diagram rendered to a display device to which a path defined by a user gesture has been mapped, wherein the manner in which the path intersects elements of the diagram indicates a vertical alignment constraint is to be applied to the intersected elements.
Figure 14:
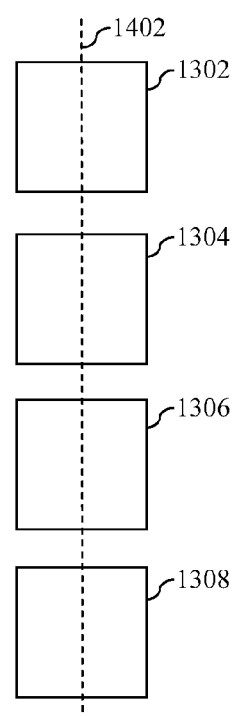
FIG. 14 depicts a portion of the exemplary diagram of FIG. 13 after a vertical alignment constraint has been applied to the intersected elements.

FIGS. 13 and 14 provide an example of the use of the method of flowchart 800 to select a vertical alignment constraint. In particular, FIG. 13 depicts a portion of an exemplary diagram that has been rendered to display device 104 via the execution of diagram rendering module 208. As shown in FIG. 13, the portion of the diagram includes a plurality of elements 1302, 1304, 1306 and 1308, each of which comprises a top, bottom, left and right side. As also shown in FIG. 13, a path 1310 associated with a user gesture has been mapped across and intersects each of the elements. From a temporal standpoint, path 1310 begins at the end that does not include an arrow and extends over time to the end that does include an arrow. Thus, path 1310 intersects element 1302 first and intersects element 1308 last. Furthermore, path 1310 intersects the top side of element 1302 first and intersects the bottom side of element 1308 last.

In accordance with one embodiment, if the first side of the first multi-sided element intersected by a path defined by a user gesture is the top side and the last side of the last multi-sided element intersected by the path is the bottom side (as is the case in FIG. 13), then a vertical alignment constraint will be applied to the first multi-sided element, the last multi-sided element and all intervening intersected elements. This is illustrated by FIG. 14, which shows the portion of the exemplary diagram from FIG. 13 after a vertical alignment constraint has been applied to elements 1302, 1304, 1306 and 1308. In accordance with this example, the vertical alignment constraint has caused a vertical axis of each of nodes 1302, 1304, 1306 and 1308 to be aligned with a vertical guideline 1402. Depending upon the implementation or the configuration of diagramming system 100, guideline 1402 may or may not be made visible to the user.

The foregoing are merely some examples of how the method of flowchart 800 may be used to select a layout constraint. Various other methods will be apparent to persons skilled in the relevant art(s) based on the teachings provided herein.

Figure 15:
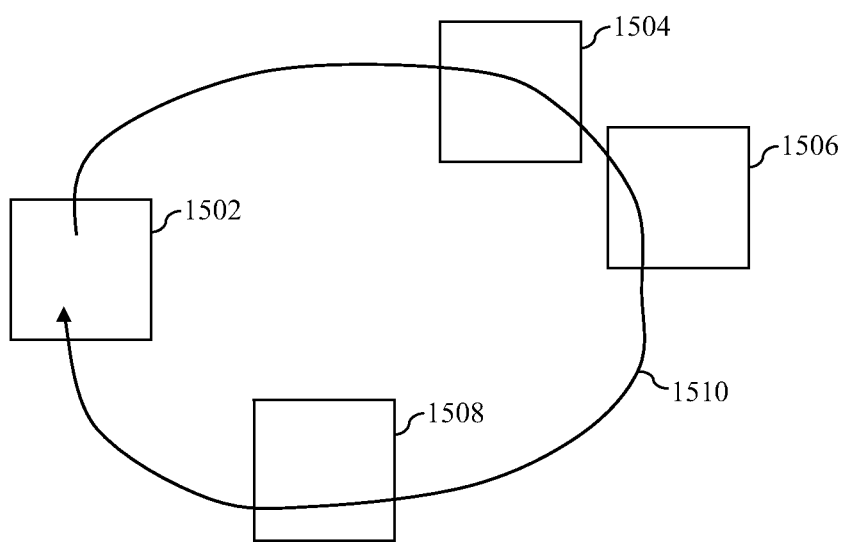
FIG. 15 depicts a portion of an exemplary diagram rendered to a display device to which a path defined by a user gesture has been mapped, wherein the manner in which the path intersects elements of the diagram indicates a circular alignment constraint is to be applied to the intersected elements.
Figure 16:
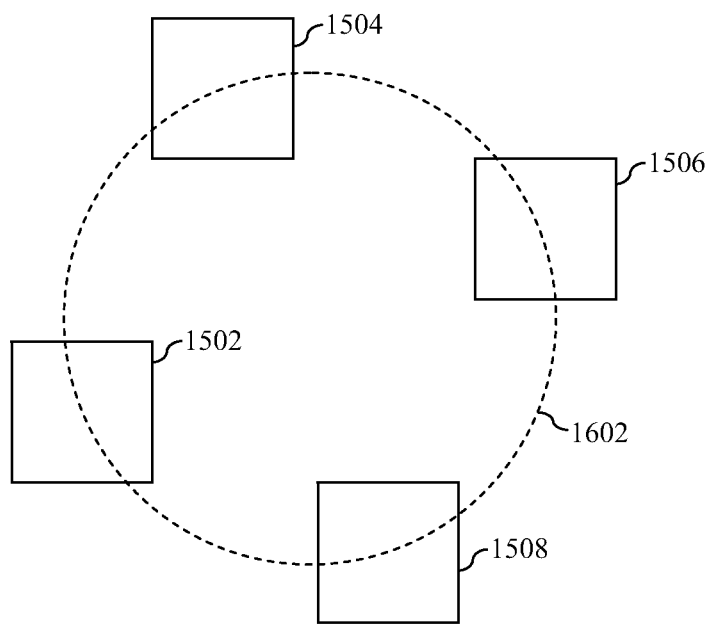
FIG. 16 depicts a portion of the exemplary diagram of FIG. 15 after a circular alignment constraint has been applied to the intersected elements.

FIGS. 15 and 16 illustrate a further embodiment in which the manner in which a path defined by a user gesture intersects elements of a diagram may be used to determine the type of layout constraint to be applied to the intersected elements. In accordance with such an embodiment, if the path both begins and ends inside the same element, then a circular alignment constraint is applied to the intersected elements. By way of example, FIG. 15 depicts a portion of an exemplary diagram that has been rendered to display device 104 via the execution of diagram rendering module 208. As shown in FIG. 15, the portion of the diagram includes a plurality of polygonal elements 1502, 1504, 1506, and 1508. As also shown in FIG. 15, a path 1510 associated with a user gesture has been mapped across and intersects each of the elements. From a temporal standpoint, path 1510 begins at the end that does not include an arrow and extends over time to the end that does include an arrow. Thus, path 1510 both begins and ends inside element 1502. As a result, a circular alignment constraint will be applied to all of the intersected elements. This is illustrated by FIG. 16, which shows the portion of the exemplary diagram from FIG. 15 after a circular alignment constraint has been applied to elements 1502, 1504, 1506 and 1508. In accordance with this example, the circular alignment constraint has caused each of elements 1502, 1504, 1506 and 1508 to be aligned in accordance with a circular guideline 1602. Depending upon the implementation or the configuration of diagramming system 100, guideline 1602 may or may not be made visible to the user.

Figure 17:
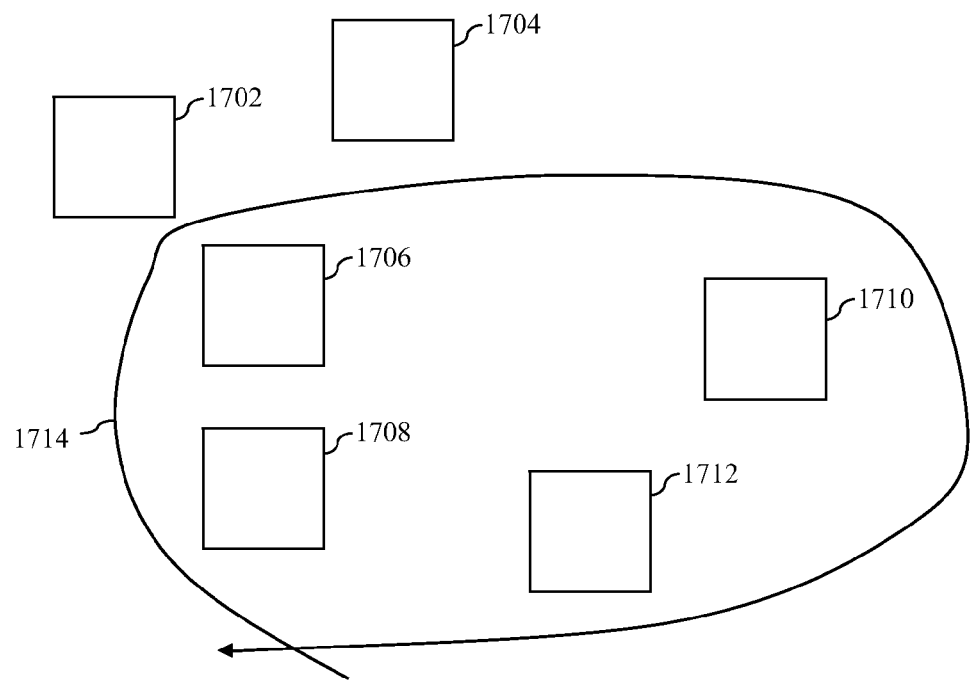
FIG. 17 depicts a portion of an exemplary diagram rendered to a display device to which a path defined by a user gesture has been mapped, wherein the path forms a shape that encloses various elements of the diagram.

In a further embodiment, the step of selecting one or more elements of the diagram based on the identified user gesture as described above in reference to step 306 of flowchart 300 comprises selecting elements of the diagram that are enclosed within a shape defined by the user gesture. This will now be illustrated with respect to FIGS. 17 and 18, each of which depicts a portion of an exemplary diagram that has been rendered to display device 104 via the execution of diagram rendering module 208. As shown in FIG. 17, the portion of the diagram includes a plurality of elements 1702, 1704, 1706, 1708, 1710 and 1712. As further shown in FIG. 17, a path 1714 associated with a user gesture has been mapped onto the diagram. Path 1714 creates a shape that encloses or surrounds each of elements 1706, 1708, 1710 and 1712. In accordance with one embodiment, diagram element selection module 202 is configured to select nodes 1706, 1708, 1710 and 1712 as the elements to which a layout constraint will be applied by virtue of the fact that these elements are enclosed by the shape formed by path 1714.

In addition to performing node selection based on path 1714 defined by a user gesture, an embodiment also determines which of a plurality of layout constraints to apply to the selected elements based on the same user gesture as described above in reference to step 308 of flowchart 300. For example, in one embodiment, user gesture to constraint mapping module 204 is configured to select a grouping constraint if the path defined by the user gesture forms a shape that surrounds two or more elements. In accordance with a grouping constraint, the elements associated with the constraint are kept together in a group and a boundary associated with such elements is prevented from overlapping with other elements in a diagram.

Figure 18:
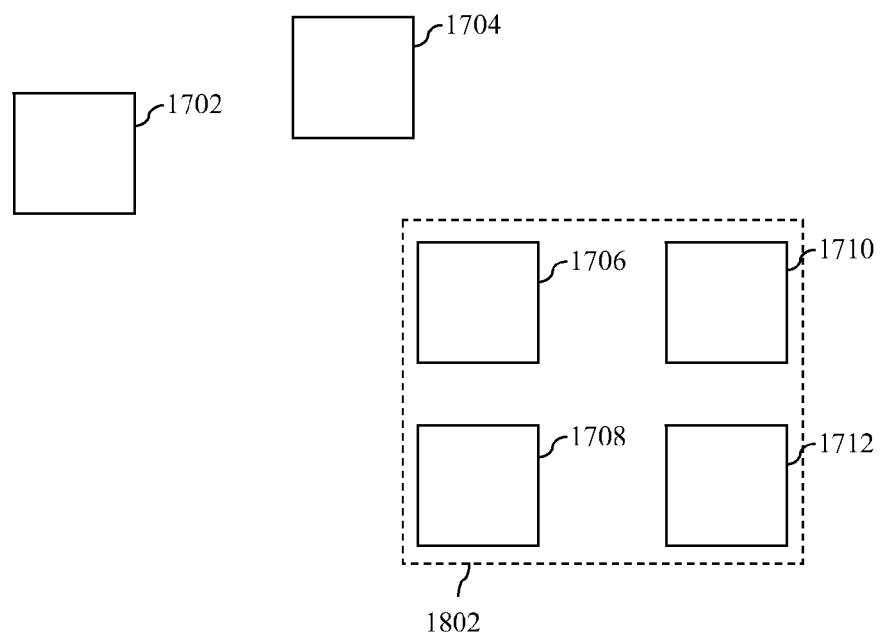
FIG. 18 depicts a portion of the exemplary diagram of FIG. 17 after a grouping constraint has been applied to the enclosed elements.

This is illustrated by FIG. 18, which shows a portion of the diagram depicted in FIG. 17 after the diagram has been updated via execution of layout constraint application module 206 and rendered again to display device 104 via execution of diagram rendering module 208. As shown in FIG. 18, a grouping constraint has been applied to selected elements 1706, 1708, 1710 and 1712 such that those elements are kept together within a particular area, the boundary of which is denoted by boundary guideline 1802. This boundary may be prevented from overlapping with other elements in the diagram. Depending upon the implementation or the configuration of diagramming system 100, boundary guideline 1802 may or may not be made visible to the user.

In certain embodiments described above, the application of an alignment constraint to selected elements in a diagram results in the selected elements being center aligned with respect to a constraint guideline. However, in alternate embodiments, elements in a diagram can be aligned using other offsets. For example, in an embodiment in which elements of a diagram include ports and in which relationships between elements are denoted by edges that connect ports, the elements can be aligned by their ports so that the edges connecting the elements are exactly horizontal, vertical, diagonal, etc.

An example of this will now be illustrated with respect to FIGS. 19 and 20, each of which depicts a portion of an exemplary diagram that has been rendered to display device 104 via the execution of diagram rendering module 208. As shown in FIG. 19, the portion of the diagram includes a plurality of nodes 1902, 1904, 1906 and 1908 and a plurality of edges 1912, 1914 and 1916. Edge 1912 connects a port 1922 of node 1902 to a port 1926 of node 1904, edge 1914 connects a port 1924 of node 1904 to a port 1928 of node 1906, and edge 1916 connects a port 1930 of node 1906 to a port 1932 of node 1908. As also shown in FIG. 19, a path 1940 associated with a user gesture has been mapped across and intersects each of the elements. As a result, a horizontal alignment constraint will be applied to all of the intersected elements. FIG. 20 shows the portion of the exemplary diagram from FIG. 19 after a horizontal alignment constraint has been applied to elements 1902, 1904, 1906 and 1908. In accordance with this example, the horizontal alignment constraint has caused the ports of elements 1902, 1904, 1906 and 1908 to be aligned in such a manner that the edges connecting the elements are exactly horizontal.

Although the foregoing describes the use of user gestures to select elements of a diagram and to apply layout constraints to the selected elements, the concepts described above can also be applied in a similar manner to modify or merge existing layout constraints associated with elements in a diagram. For example, a user gesture that selects certain diagram elements may also be interpreted as a request to modify an existing layout constraint that involves those elements. As another example, a user gesture that selects a first set of diagram elements and a second set of diagram elements can also be interpreted as a request to associate a layout constraint that involves the first set of diagram elements with the second set of diagram elements. This latter scenario will now be further described with reference to flowchart 2100 of FIG. 21.

As shown in FIG. 21, the method of flowchart 2100 begins at step 2102 in which rendering module 208 is executed by processing unit 112 to render at least a portion of a diagram to display device 104. The diagram comprises a plurality of elements.

At step 2104, user gesture processing module 124 is executed by processing unit 112 to identify a user gesture based on input received via at least one of user input device(s) 106.

At step 2106, diagram element selection module 202 is executed by processing unit 112 to select one or more first elements of the diagram and one or more second elements of the diagram based on the user gesture identified during step 304.

At step 2108, diagramming module 122 is executed by processing unit 112 to identify a layout constraint associated with the first selected element(s).

At step 2110, layout constraint application module 206 is executed by processing unit 112 to apply the layout constraint identified during step 2108 to the second selected element(s).

At step 2112, diagram rendering module 208 is executed by processing unit 112 to render at least a portion of the diagram to display device 104 after application of the layout constraint identified during step 2108 to the second selected element(s). During this step, if the application of the identified layout constraint to the second selected element(s) has caused a change in the layout of the diagram, that change may be made apparent to the user when the diagram, or portion thereof, is viewed by the user on display device 104.

II. Example Computer System Implementation

FIG. 22 depicts an example computer 2200 that may be used to implement diagramming system 100 as described above in reference to FIG. 1. Computer 2200 may represent a general-purpose computing device in the form of a conventional personal computer, a mobile computer, or a workstation, for example, or computer 2200 may be a special purpose computing device. The description of computer 2200 provided herein is provided for purposes of illustration, and is not intended to be limiting. Embodiments may be implemented in further types of computer systems, as would be known to persons skilled in the relevant art(s).

As shown in FIG. 22, computer 2200 includes a processing unit 2202, a system memory 2204, and a bus 2206 that couples various system components including system memory 2204 to processing unit 2202. Processing unit 2202 may comprise one or more processors or processing cores. Bus 2206 represents one or more of any of several types of bus structures, including a memory bus or memory controller, a peripheral bus, an accelerated graphics port, and a processor or local bus using any of a variety of bus architectures. System memory 2204 includes read only memory (ROM) 2208 and random access memory (RAM) 2210. A basic input/output system 2212 (BIOS) is stored in ROM 2208.

Computer 2200 also has one or more of the following drives: a hard disk drive 2214 for reading from and writing to a hard disk, a magnetic disk drive 2216 for reading from or writing to a removable magnetic disk 2218, and an optical disk drive 2220 for reading from or writing to a removable optical disk 2222 such as a CD ROM, DVD ROM, or other optical media. Hard disk drive 2214, magnetic disk drive 2216, and optical disk drive 2220 are connected to bus 2206 by a hard disk drive interface 2224, a magnetic disk drive interface 2226, and an optical drive interface 2228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2230, one or more application programs 2232, other program modules 2234, and program data 2236. Application programs 2232 or program modules 2234 may include, for example, any of the software modules described herein, such as any of the software modules described in reference to FIGS. 1 and 2, as well as logic for performing any of the various method steps described herein, such as logic for performing any of the method steps of flowcharts 300, 400, 800 or 2100.

A user may enter commands and information into the computer 2200 through input devices such as keyboard 2238 and pointing device 2240. Other input devices (not shown) may include a microphone, joystick, game controller, scanner, or the like. These and other input devices are often connected to the processing unit 2202 through a serial port interface 2242 that is coupled to bus 2206, but may be connected by other interfaces, such as a parallel port, game port, or a universal serial bus (USB).

A monitor 2244 or other type of display device is also connected to bus 2206 via an interface, such as a video adapter 2246. In addition to the monitor, computer 2200 may include other peripheral output devices (not shown) such as speakers and printers.

Computer 2200 is connected to a network 2248 (e.g., a local area network or wide area network such as the Internet) through a network interface or adapter 2250, a modem 2252, or other means for establishing communications over the network. Modem 2252, which may be internal or external, is connected to bus 2206 via serial port interface 2242.

As used herein, the terms "computer program medium" and "computer-readable medium" are used to generally refer to media such as the hard disk associated with hard disk drive 2214, removable magnetic disk 2218, removable optical disk 2222, as well as other media such as flash memory cards, digital video disks, random access memories (RAMs), read only memories (ROM), and the like.

As noted above, computer programs and modules (including application programs 2232 and other program modules 2234) may be stored on the hard disk, magnetic disk, optical disk, ROM, or RAM. Such computer programs may also be received via network interface 2250 or serial port interface 2242. Such computer programs, when executed or loaded by an application, enable computer 2200 to implement features of embodiments discussed herein. Accordingly, such computer programs represent controllers of the computer 2200.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method implemented in a processor-based computing system, comprising:
    rendering at least a portion of a diagram to a display device coupled to the computing system, the diagram comprising a plurality of elements;
    identifying a user gesture based on input received via at least one user input device coupled to the computing system;
    selecting, subsequent to said identifying, a subset of elements from among a plurality of different elements of the diagram based on the identified user gesture;
    selecting, automatically, a layout constraint from among a plurality of layout constraints based on a path or a shape of the identified user gesture, each layout constraint controlling a manner in which elements of a diagram are arranged when rendered to a display device;
    applying the selected layout constraint to the selected subset of elements; and
    rendering at least a portion of the diagram to the display device after application of the selected layout constraint to the selected subset of elements.

2. The method of claim 1, wherein identifying the user gesture comprises:
    determining if the input corresponds to a user gesture in a library of predefined user gestures.

3. The method of claim 1, wherein identifying the user gesture based on input received via the at least one user input device comprises identifying the user gesture based on input received via at least one of a mouse, a touch screen, or a video capture device.

4. The method of claim 1, wherein selecting the subset of elements from among the plurality of different elements of the diagram based on the identified user gesture comprises:
    selecting elements of the diagram that are intersected by a path defined by the user gesture.

5. The method of claim 4, wherein selecting the layout constraint based on the identified user gesture comprises:
    selecting a vertical alignment constraint if the path defined by the user gesture corresponds to a vertical line.

6. The method of claim 4, wherein selecting the layout constraint based on the identified user gesture comprises:
    selecting a horizontal alignment constraint if the path defined by the user gesture corresponds to a horizontal line.

7. The method of claim 4, wherein selecting the layout constraint based on the identified user gesture comprises:
    selecting a circular alignment constraint if the path defined by the user gesture begins and ends inside the same element.

8. The method of claim 4, wherein selecting the layout constraint based on the identified user gesture comprises:
    identifying a first element intersected by the path, the first element comprising a plurality of sides;
    identifying a side of the first element that was first intersected by the path;
    identifying a last element intersected by the path, the last element comprising a plurality of sides;
    identifying a side of the last element that was last intersected by the path;
    selecting an alignment constraint based on the identified sides of the first element and the last element.

9. The method of claim 1, wherein selecting the subset of elements from among the plurality of different elements of the diagram based on the identified user gesture comprises selecting elements of the diagram that are enclosed within a shape defined by the user gesture; and
    wherein selecting the layout constraint based on the identified user gesture comprises selecting a grouping constraint.

10. The method of claim 1, wherein identifying the user gesture based on input received via at least one user input device coupled to the computing system comprises identifying a multi-touch user gesture.

11. The method of claim 1, further comprising:
rendering a line that follows a path defined by the user gesture to the display device.

12. A system comprising:
a display device;
at least one user input device;
a memory that stores at least a diagramming module and a user gesture processing module; and
a processing unit that executes the diagramming module to render at least a portion of a diagram to the display device, the diagram comprising a plurality of elements;
the processing unit further executes the user gesture processing module to identify a user gesture based on input received via the at least one user input device, and
the processing unit further executes the diagramming module to select, subsequent to identifying the user gesture, a subset of elements from among a plurality of different elements of the diagram based on the identified user gesture, to automatically select a layout constraint from among a plurality of layout constraints based on a path or a shape of the identified user gesture, wherein each layout constraint controls a manner in which elements of a diagram are arranged when rendered to a display device, to apply the selected layout constraint to the selected subset of elements and to render at least a portion of the diagram to the display device after application of the selected layout constraint to the selected subset of elements.

13. The system of claim 12, wherein the memory further stores a library of predefined user gestures and wherein the processing unit executes the user gesture processing module to determine if the input corresponds to a user gesture in the library of predefined user gestures.

14. The system of claim 12, wherein the at least one user input device comprises at least one of a mouse, a touch screen, or a video capture device.

15. The system of claim 12, wherein the processing unit executes the diagramming module to select elements of the diagram that are intersected by a path defined by the user gesture.

16. The system of claim 12, wherein the processing unit executes the diagramming module to select elements of the diagram that are enclosed within a shape defined by the user gesture.

17. The system of claim 12, wherein the processing unit executes the diagramming module to render a line that follows a path defined by the user gesture to the display device.

18. A computer-readable program storage device having instructions stored thereon that, when executed by a processing device, perform a method, the method comprising:
rendering at least a portion of a diagram to a display device coupled to the computing system, the diagram comprising a plurality of elements;
identifying a user gesture based on input received via at least one user input device coupled to the computing system;
selecting, subsequent to said identifying, a subset of elements from among a plurality of different elements of the diagram based on the identified user gesture;
selecting, automatically, a layout constraint from among a plurality of layout constraints based on a path or a shape of the identified user gesture, each layout constraint controlling a manner in which elements of a diagram are arranged when rendered to a display device;
applying the selected layout constraint to the selected subset of elements; and
rendering at least a portion of the diagram to the display device after application of the selected layout constraint to the selected subset of elements.

19. The computer-readable program storage device of claim 18, wherein selecting the subset of elements from among the plurality of different elements of the diagram based on the identified user gesture comprises selecting elements of the diagram that are intersected by a path defined by the user gesture.

20. The computer-readable program storage device of claim 18, wherein selecting the subset of elements from among the plurality of different elements of the diagram based on the identified user gesture comprises selecting elements of the diagram that are enclosed within a shape defined by the user gesture.

* * * * *